United States Patent
Hewinson

(10) Patent No.: US 8,583,750 B1
(45) Date of Patent: Nov. 12, 2013

(54) INFERRING IDENTITY OF INTENDED COMMUNICATION RECIPIENT

(75) Inventor: Philip Hewinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/572,208

(22) Filed: Aug. 10, 2012

(51) Int. Cl.
*G06F 15/16* (2006.01)

(52) U.S. Cl.
USPC .......................... 709/206; 709/223; 709/224

(58) Field of Classification Search
USPC ................................. 709/206–207, 223–224
See application file for complete search history.

(56) References Cited

U.S. PATENT DOCUMENTS

| | | | |
|---|---|---|---|
| 5,369,685 A | 11/1994 | Kero | |
| 5,483,586 A | 1/1996 | Sussman | |
| 5,752,232 A | 5/1998 | Basore et al. | |
| 5,991,364 A | 11/1999 | McAllister et al. | |
| 6,044,399 A * | 3/2000 | Elledge | 709/220 |
| 6,463,533 B1 * | 10/2002 | Calamera et al. | 726/22 |
| 6,650,735 B2 | 11/2003 | Burton et al. | |
| 6,768,792 B2 | 7/2004 | Brown et al. | |
| 6,999,930 B1 | 2/2006 | Roberts et al. | |
| 7,120,927 B1 * | 10/2006 | Beyda et al. | 709/206 |
| 7,487,089 B2 | 2/2009 | Mozer | |
| 7,526,073 B2 | 4/2009 | Romeo | |
| 7,536,304 B2 | 5/2009 | Di Mambro et al. | |
| 7,571,100 B2 | 8/2009 | Lenir et al. | |
| 7,747,446 B2 | 6/2010 | Blass et al. | |
| 7,890,957 B2 | 2/2011 | Campbell | |
| 7,966,171 B2 | 6/2011 | Gilbert et al. | |
| 7,970,384 B1 | 6/2011 | Lambert et al. | |
| 8,095,672 B1 * | 1/2012 | Newstadt et al. | 709/206 |
| 8,140,340 B2 | 3/2012 | Bhogal et al. | |
| 8,185,646 B2 | 5/2012 | Headley | |
| 8,218,744 B2 | 7/2012 | Belz et al. | |
| 8,219,404 B2 | 7/2012 | Weinberg et al. | |
| 8,225,103 B2 | 7/2012 | Chiou et al. | |
| 8,302,152 B1 | 10/2012 | Hewinson | |
| 8,358,759 B2 | 1/2013 | Kumar | |
| 2002/0147914 A1 | 10/2002 | Arnold | |
| 2002/0152272 A1 * | 10/2002 | Yairi | 709/206 |
| 2005/0164651 A1 | 7/2005 | Ollis et al. | |
| 2005/0232470 A1 | 10/2005 | Chaudhari et al. | |
| 2006/0035632 A1 | 2/2006 | Sorvari et al. | |
| 2006/0235684 A1 | 10/2006 | Chang | |
| 2006/0277043 A1 | 12/2006 | Tomes et al. | |
| 2006/0293891 A1 | 12/2006 | Pathuel | |
| 2007/0060114 A1 | 3/2007 | Ramer et al. | |
| 2007/0066288 A1 | 3/2007 | Soelberg et al. | |
| 2007/0100929 A1 | 5/2007 | DeRobertis et al. | |
| 2007/0169202 A1 * | 7/2007 | Goldberg et al. | 726/26 |
| 2008/0037720 A1 | 2/2008 | Thomson et al. | |

(Continued)

OTHER PUBLICATIONS

Benyon et al., "Adaptive Systems: from intelligent tutoring to autonomous agents", 52 pages, 1993.

(Continued)

*Primary Examiner* — Philip B Tran

(74) *Attorney, Agent, or Firm* — Fish & Richardson P.C.

(57) ABSTRACT

Systems, methods performed by data processing apparatus and computer storage media encoded with computer programs for receiving user input specifying an alias of an intended communication recipient, comparing the specified alias with identities of one or more potential recipients identified based on implicit connections inferred from explicit information relating to the user, identifying a best matching recipient based on a result of the comparing, and initiating a communication instance with the identified best matching recipient.

30 Claims, 5 Drawing Sheets

(56) References Cited

U.S. PATENT DOCUMENTS

| | | | |
|---|---|---|---|
| 2008/0082332 A1 | 4/2008 | Mallett et al. | |
| 2010/0030738 A1 | 2/2010 | Geer | |
| 2010/0088753 A1* | 4/2010 | Ayres et al. | 709/206 |
| 2010/0161338 A1 | 6/2010 | Tofighbakhsh | |
| 2010/0316198 A1 | 12/2010 | Balasaygun et al. | |
| 2011/0022388 A1 | 1/2011 | Wu et al. | |
| 2011/0047076 A1* | 2/2011 | Carlson et al. | 705/44 |
| 2011/0047245 A1* | 2/2011 | Abramson et al. | 709/219 |
| 2011/0082874 A1 | 4/2011 | Gainsboro et al. | |
| 2011/0177829 A1 | 7/2011 | Platt et al. | |
| 2011/0194682 A1 | 8/2011 | Hans et al. | |
| 2011/0221671 A1 | 9/2011 | King et al. | |
| 2011/0231310 A1 | 9/2011 | Roberts et al. | |
| 2011/0258686 A1* | 10/2011 | Raj et al. | 726/6 |
| 2011/0288866 A1 | 11/2011 | Rasmussen | |
| 2011/0302128 A1 | 12/2011 | Hayashi et al. | |
| 2012/0022874 A1 | 1/2012 | Lloyd et al. | |
| 2012/0065973 A1 | 3/2012 | Cho et al. | |
| 2012/0078638 A1 | 3/2012 | Novack et al. | |
| 2012/0084078 A1 | 4/2012 | Moganti et al. | |
| 2012/0134478 A1 | 5/2012 | Broman et al. | |
| 2012/0173239 A1 | 7/2012 | Sanchez Asenjo et al. | |
| 2012/0232900 A1 | 9/2012 | Brummer et al. | |
| 2012/0239407 A1 | 9/2012 | Lynch et al. | |
| 2012/0253790 A1 | 10/2012 | Heck et al. | |
| 2012/0253811 A1 | 10/2012 | Breslin et al. | |
| 2012/0260188 A1* | 10/2012 | Park et al. | 707/776 |
| 2012/0310980 A1* | 12/2012 | Hepper | 707/776 |
| 2013/0006634 A1 | 1/2013 | Grokop et al. | |

OTHER PUBLICATIONS

Cohen et al., "An Open Agent Architecture", 8 pages, 1994.
Maes, Patti, "Agents that Reduce Work and Information Overlad", file:///C|/Misdocumentos/alberto/itesm/Sistemas/material_curso/maes94/maes94.html, Oct. 10, 2000, 17 pages.
Nardi et al., "Collaborative, Programmable Intelligent Agents", Communications of the ACM, vol. 41, No. 3, Mar. 1998, 9 pages.
Aswani et al., "Mining Information for Instance Unification", ISWC 2006, LNCS 4273, pp. 329-342, 2006, Springer-Verlag Berlin Heidelberg.
Pantel, "Alias detection in malicious environments", Proceedings of AAAI fall symposium on capturing and using patterns for evidence detection, pp. 14-20, 2006.
Office Action issued in U.S. Appl. No. 13/561,621 on Oct. 26, 2012, 12 pages.
Office Action issued in U.S. Appl. No. 13/572,369 on Dec. 28, 2012, 9 pages.
Office Action issued in U.S. Appl. No. 13/572,364 on Oct. 15, 2012, 21 pages.
Notice of Allowance issued in U.S. Appl. No. 13/572,369 on Feb. 6, 2013, 7 pages.
Office Action issued in U.S. Appl. No. 13/561,621 on Feb. 20, 2013, 12 pages.
Notice of Allowance issued in U.S. Appl. No. 13/572,369 on Mar. 22, 2013, 15 pages.
Office Action issued in U.S. Appl. No. 13/572,364 on Apr. 11, 2013, 22 pages.

* cited by examiner

INFERRING IDENTITY OF INTENDED COMMUNICATION RECIPIENT

FIELD

This specification generally relates to inferring the identity of an intended communication recipient.

BACKGROUND

When not speaking face-to-face, people employ various forms of electronic communication (e.g., telephone calls, email messages, text messages, instant messages, social network posting, e-calendar invitations, online content sharing and the like) in order to converse or otherwise exchange information with one another. Typically, to initiate an instance of electronic communication, the originator must input or otherwise specify an identifier that uniquely identifies the desired communication recipient. For example, if the originator desires to place a telephone call to the recipient, the originator first must input the recipient's unique telephone number, which typically is composed of ten digits such as 555-123-4567. Similarly, if the originator desires to send an email message to the recipient, the originator first must input the recipient's unique email address, which typically takes the form recipient@email.net. For each recipient with whom the originator wants to initiate electronic communication on a regular basis, the originator typically will maintain a data repository (e.g., in the form of an electronic contact list) to keep track of all the recipients' various and respective unique communication identifiers (i.e., phone numbers, email addresses, etc.).

SUMMARY

In general, one aspect of the subject matter described in this specification may be embodied in systems, methods performed by data processing apparatus and/or computer storage media encoded with computer programs that include the actions of receiving user input specifying an alias of an intended communication recipient, comparing the specified alias with identities of one or more potential recipients identified based on implicit connections inferred from explicit information relating to the user, identifying a best matching recipient based on a result of the comparing, and initiating a communication instance with the identified best matching recipient.

Identifying a best matching recipient may include using the inferred implicit connections to disambiguate between two or more potential recipients identified from explicit information such as an electronic contact list. The intended communication recipient may include at least one of a person, a non-human entity and a group of entities having a common identifiable characteristic. The explicit information may include information obtained from one or more of a social network, email messages, documents and search history.

The actions may further include, prior to receiving the user input specifying the alias, performing an analysis on the explicit information relating to the user to infer the implicit connections. Alternatively, the actions may include, subsequent to receiving the user input specifying the alias, performing an analysis on the explicit information relating to the user to infer the implicit connections.

Initiating a communication instance may include one or more of dialing a telephone number, addressing an email message, addressing a text message, posting an online message, sending a calendar invite, and sharing content.

The actions may further include, prior to comparing, generating explicit information by performing a personalized search relating at least in part to the user and to the specified alias and/or, prior to initiating the communication instance, confirming the identified best matching recipient with the user.

The actions may further include receiving user input specifying another alias relating to communication content (e.g., media content, a date, a location, an object and/or an event), comparing the specified other alias with identities of one or more potential content items identified based on implicit connections inferred from explicit information relating to the user, identifying a best matching content item based on a result of the comparing, and transmitting the identified best matching content item along with the communication instance to the identified best matching recipient.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In referring to others, a person will often use an alias rather than the other person's proper name. For example, when communicating to or about family members, a person may use aliases such as "mom," "dad," "uncle," "sister," "nephew" or the like, which, though generic on their face, refer to specific individuals when taken in context. Similarly, when communicating to or about a group of one or more people, a person may use an alias—such as "friends," "colleagues," or "book group"—that refers to a specific group of people in the collective. In the same vein, a facially generic alias such as "bank," "grocery store," or "pizza joint" can be used to refer to a specific enterprise or entity. The present inventor recognized that it may be advantageous to provide communication originators (i.e., one desiring to make a phone call, send an email, post a message, etc.) with an ability to identify a communication recipient using such aliases, which are automatically mapped to specific individuals or entities based on implicit connections inferred from various sources of explicit information such as the originator's social networks, search history, email, documents, or the like.

Figure 1:
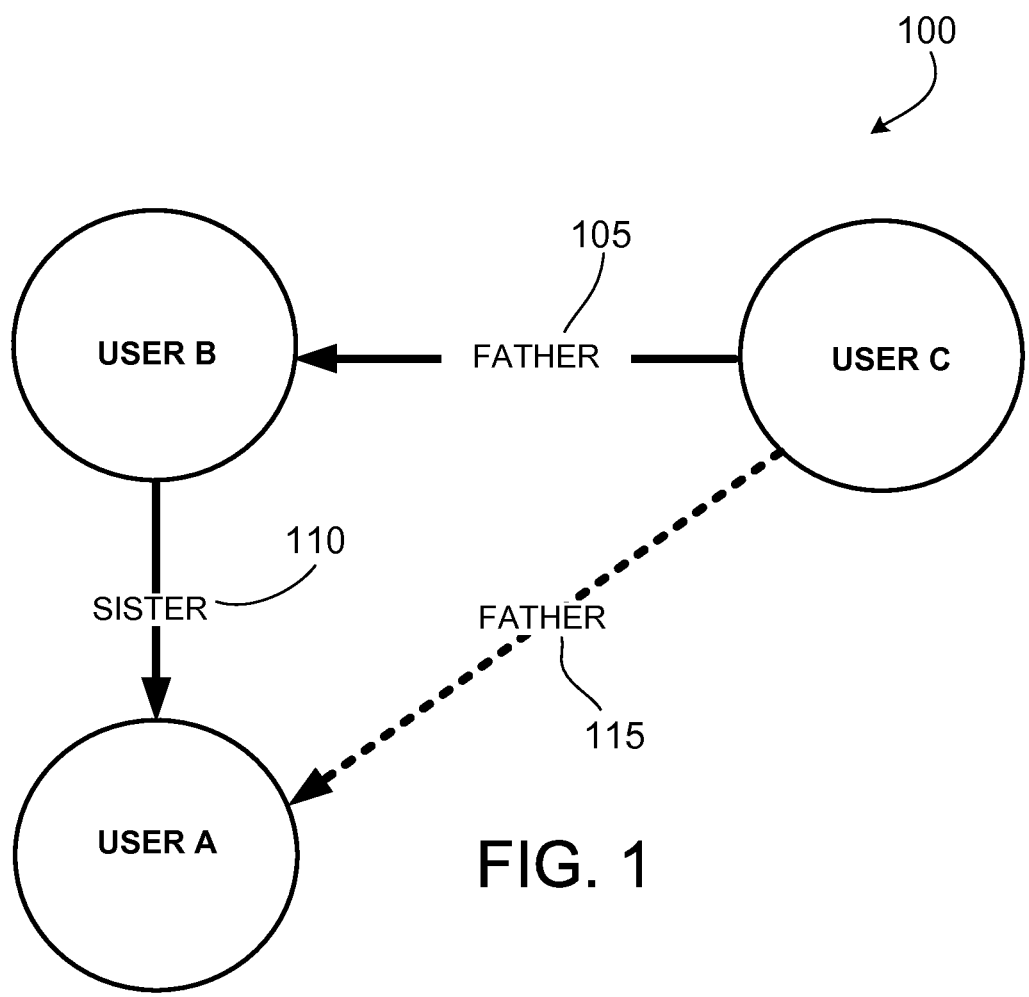
FIG. 1 is a social graph showing examples of explicit and implicit connections.

FIG. 1 is a social graph 100 showing examples of explicit and implicit connections, in this case, familial relationships.

In the example shown, assume that the social graph depicts a portion of a social network to which User A, the communication originator, belongs, as do Users B and C. Assume further that in the social network two connections—namely, the familial relationships of sister 110 and father 105—have been made explicit, thereby providing the explicit knowledge that User B is the sister of User A and that User C is the father of User B. Based on this explicit knowledge, an implicit connection (father 115, shown as a dotted line) can be inferred, thereby providing the implicit knowledge that User C also is the father of User A. Consequently, if User A expresses a desire to communicate with "father," this inferred, implicit connection can be used to identify the specific individual (namely, User C) to whom the communication should be directed. In addition, User C's contact information (e.g., telephone number and/or email address) may be discernible, e.g., from User C's social network profile. As a result, without having to specify User C by name, and without having to know or specify User C's contact information, User A can initiate an instance of communication to User C simply by expressing a desire to communicate with "father"—for example, the command "call father" could be used to initiate a telephone call to from User A to User C.

Although it might ordinarily be expected that User A already would have his father's explicit identity and corresponding contact information in his electronic contact list, and thus would not need inferred, implicit connections to communicate with his father, there are several scenarios in which the necessary explicit information was not available. For example, if User A was calling from a phone other than his, or from a brand new phone on which his contact list did not yet exist. In either of those scenarios, however, the system would need to be apprised of User A's identity (e.g., through voice recognition or otherwise) so that it would have the necessary context to determine the universe of explicit information available from which to infer implicit connections.

Although the example social graph shown in FIG. 1 depicts only a single level of indirection, implicit connections may be inferred using two or more levels of indirection depending on the available explicit connections and the nature of the implicit connections to be inferred. In addition, implicit connections other than or in addition to familial relationships can be inferred and used to identify intended communication recipients.

Figure 2:
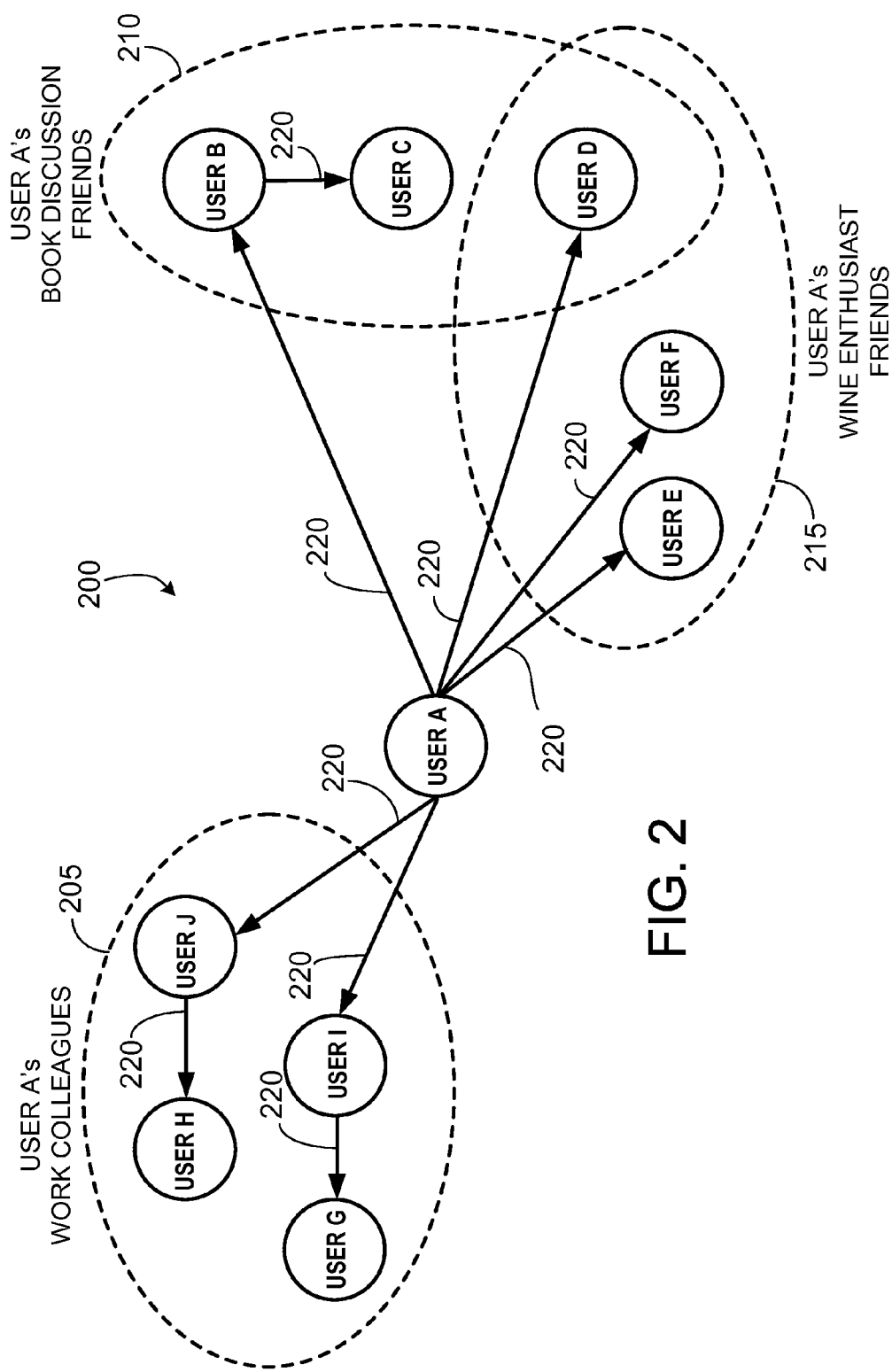
FIG. 2 is an example of a social graph depicting inferred implicit connections.

For example, FIG. 2 is an example of a social graph depicting various other implicit connections that may be inferred from a social network to which Users A-J belong. In this example, User A, the communication originator, is shown as having explicit connections 220 with Users B, D, E, F, I and J. Users J and I have explicit connections 220 with Users H and G, respectively, and User B has an explicit connection with User C. By analyzing the explicit connections, and potentially the various communications and interactions among Users A-J, inferences can be made to identify certain implicit connections 205, 210 and 215. For example, based on information such as stated interests, online activities, previous communications and the like, an inference could be made that Users B and D, both of which have explicit connections with User A, are among the people with whom User A enjoys discussing books. In other words, a "User A's Book Discussion Friends" implicit connection 210 can be inferred to exist between User A and Users B and D. Similarly, even though User C does not have an explicit connection with User A, interactions and communications by and between User B and User C (who share an explicit connection) could be analyzed and a determination could be made to extend the inferred, implicit connection 210 to include User C. Consequently, if User A desires to communicate with his "Book Discussion Friends," the implicit connection 210 could be used to specifically identify Users B, C and D as the intended recipients of that communication without User A having to specify them by name and/or without having to know or specify their respective contact information.

Similarly, the implicit connection 215 could be inferred and used by User A to easily communicate with his "Wine Enthusiast Friends." Note that any given user potentially could be determined to have multiple implicit connections with User A—in this example, User A has two different implicit connections 210 and 215 to User D, signifying that User D is both among User A's "Book Discussion Friends" and his "Wine Enthusiast Friends."

As another example, an implicit connection 205 between User A and Users G, H, I and J could be inferred based on those users' common place of employment, which may be discernible, e.g., from the users' respective social network profiles and/or various communications and interactions among them or others. Note that making such inferences is potentially possible even if explicit connections do not exist among the users. However, using the existence of explicit connections to limit the subset of the social network to analyze, and thus the quantity of users to consider, tends to make the analysis more computationally feasible.

The techniques described here potentially can be used to infer the identity of essentially any indeterminate person, place, object, event or the like provided that sufficient explicit information is available from which the necessary inferences and implicit connections can be made. In an implementation, these techniques can be used to initiate an instance of communication from a communication originator to an intended recipient, whose actual identity is indeterminate or ambiguous based on the alias used by the communication originator. For example, using a suitable communication device (e.g., mobile phone, laptop, tablet, etc.) having an appropriate user interface (e.g., voice-input speech recognition, graphical user interface, command line, keypad, gesture input, etc.), a communication originator could initiate an instance of communicate by specifying a command in the format of [COMMUNICATION TYPE] [ALIAS OF COMMUNICATION RECIPIENT], where examples of [COMMUNICATION TYPE] could include "call," "email," "text," "invite" or "post," and examples of [ALIAS COMMUNICATION RECIPIENT] could include "father," "doctor," "colleagues," "pizza joint," "book group," or essentially any other alias that could be disambiguated using implicit connections inferred from available explicit information.

Optionally, the command could further include a [COMMUNICATION CONTENT] field, which would specify the content of the communication. As an example, the communication originator could issue the command (by voice, keyboard or otherwise) "post soccer photos to teammates," which would be parsed and executed to cause a posting (e.g., on a social network or photo sharing website) of the originator's recent soccer match photos (the identity and location of which could be inferred using the techniques described herein) along with an email notification of the posting to the originator's soccer teammates, the actual identities of whom would be inferred as described above. As another example, the communication originator could issue the command "invite book group for Wednesday evening," which would be parsed and executed to cause an e-calendar invitation to be sent to the originator's book group (identified through inferred implicit connections) for the upcoming Wednesday at 7 pm, with that exact time having been inferred by analyzing available explicit information (e.g., prior communications, prior calendar invitations or the like).

Alternatively, or in addition, inferred implicit connections could be used in conjunction with explicit contact information to disambiguate intended communication recipients when, for example, the originator's electronic contact list includes two or more entries that match, or partially so, the specified alias. For example, if the communication originator issued a command "call Bob" to his mobile phone and the originator's contact list included telephone numbers for three people named Bob, other available explicit information (e.g., social networks, email, call records, etc.) could be analyzed to determine which of the three Bobs is the most likely intended recipient, for example, that particular "Bob" that the originator has called or otherwise communicated with most frequently and/or most recently.

The techniques described here may, in appropriate circumstances, permit a user to generalize or otherwise anonymize personal information that is provided to a central computer service. For example, where appropriate, a user may be provided with an option to opt in or opt out of services such as those described herein that may need to obtain particular information in order to work properly. Also, a user's location or other information may be generalized, such as by reporting or saving the user according to a relatively large geographic metric such as a zip code. Moreover, a service may limit the ways in which such information can be used or shared, and the length of time that the information will be stored. Such factors may be made known to a user who, in appropriate situations, may choose to provide more or less information while recognizing that the level of service they are provided may be reduced as the level of obtained information is decreased.

Figure 3:
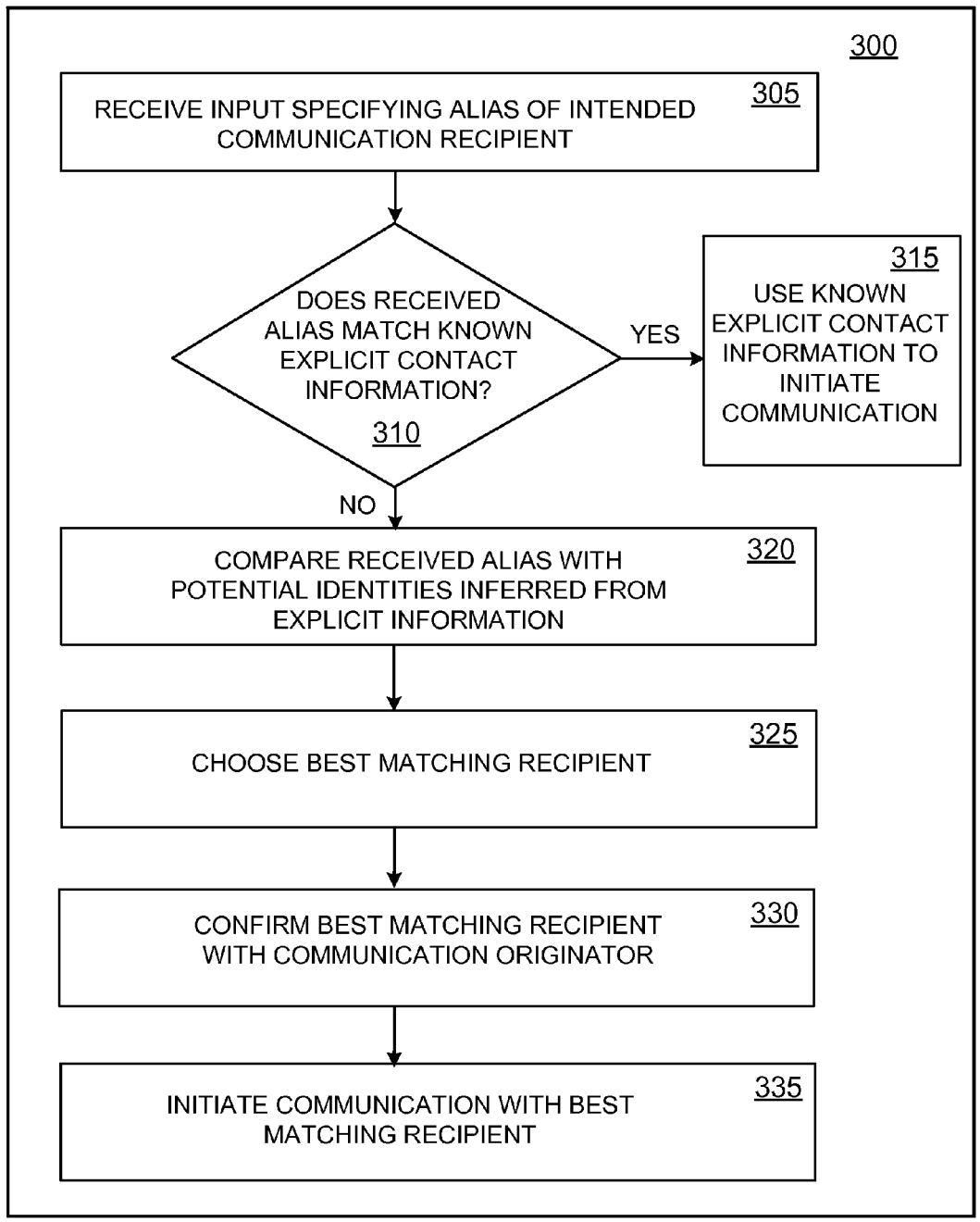
FIG. 3 is a flowchart of an example process for identifying a communication recipient based on an implicit connection inferred from a communication originator's explicit information.

FIG. 3 is a flowchart of an example process 300 for identifying a communication recipient based on an implicit connection inferred from a user's explicit information. At 305 the process 300 receives user input from the communication originator specifying an alias of an intended communication recipient. At 310 the process 300 determines whether the received alias matches explicit contact information, if any, known to the process 300 that conclusively determines the identity of the intended recipient. If so, the process, at 315, uses the explicit contact information to initiate the communication. If not, at 320, the process 300 compares the received alias with identities of potential recipients inferred from explicit information, for example, such as gleaned from one or more social networks to which the communication originator belongs. Note that the analysis performed to infer the potential identities could be performed either in a pre-processing manner (i.e., prior to receiving the alias at 305) or, depending on the quantity of explicit information and available computational resources, in a dynamic, real time manner (i.e., after receiving the alias at 305), or a combination of both. Next, at 325, as a result of the comparison, the process 300 chooses the inferred potential identity that best matches the received alias. Optionally, at 330, to help prevent misdirected communications, the process 300 could confirm the chosen best match with the communication originator prior to actually initiating the communication. Lastly, at 335, assuming either that the communication originator has confirmed the chosen identity or that no confirmation was sought, the process 300 initiates the communication, e.g., by calling, emailing, texting, etc. the identified communication recipient.

Figure 4:
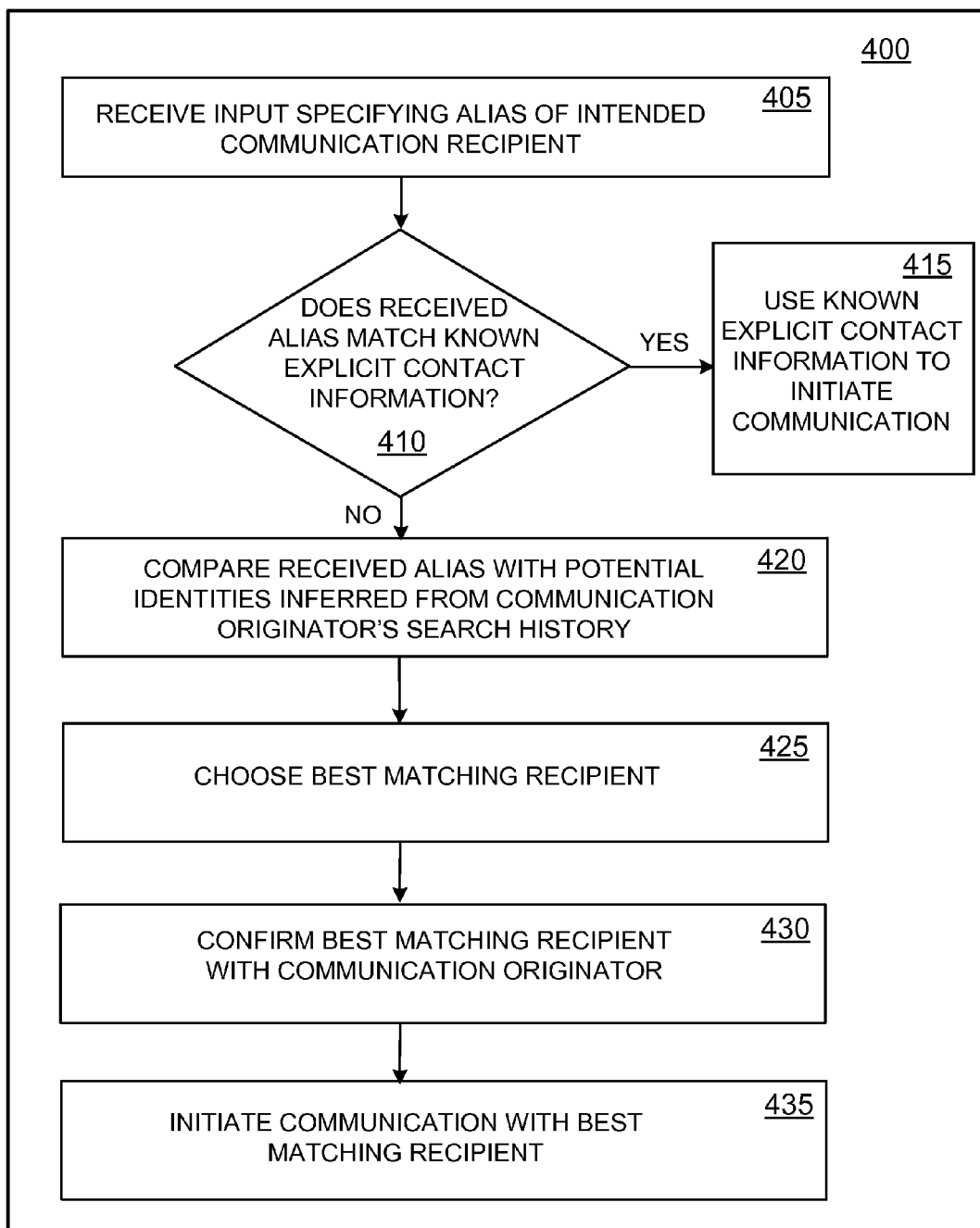
FIG. 4 is a flowchart of an example process for identifying a communication recipient based on an implicit connection inferred from a communication originator's search history.

Alternatively, or in addition, implicit connections can be inferred from a user's (i.e., the communication originator's) search history—that is, from online searches previously performed by the communication originator. FIG. 4 is a flowchart of an example process 400 for identifying a communication recipient based on an implicit connection inferred from a communication originator's search history. At 405 the process 400 receives user input from the communication originator specifying an alias of an intended communication recipient. At 410 the process 400 determines whether the received alias matches explicit contact information, if any, known to the process 400 that conclusively determines the identity of the intended recipient. If so, the process, at 415, uses the explicit contact information to initiate the communication. If not, at 420, the process 400 compares the received alias with identities of potential recipients inferred from analysis from the user's search history.

For example, if the received alias is "pizza joint," the process 400 could analyze the user's search history to determine that the communication originator had recently done a local search for nearby pizza restaurants and, following the search, had clicked on a specific search result corresponding to specific pizza restaurant's website and, potentially, had spent some time on that website perhaps looking at the online menu or the like. In that case, a reasonable inference could be made that that specific pizza restaurant is the one the communication originator was referring to when specifying the alias "pizza joint." Alternatively, or in addition to analyzing the communication originator's search history, the process 400 could itself perform a personalized search (i.e., one that benefits from knowing the communication originator's identity) to identify pizza restaurants that are located near the originator's known home location and then base its inferences on that information, in whole or in part. In any event, the analysis performed by the process 400 could be done either in a pre-processing manner (i.e., prior to receiving the alias at 405) or in a dynamic, real time manner (i.e., after receiving the alias at 405) or a combination of both.

Next, at 425, as a result of the analysis, the process 400 chooses the inferred potential identity that best matches the received alias. Optionally, at 430, to help prevent misdirected communications, the process 400 could confirm the chosen best match with the communication originator prior to actually initiating the communication. Lastly, at 435, assuming either that the communication originator has confirmed the chosen identity or that no confirmation was sought, the process 400 initiates the communication, e.g., by calling, emailing, texting, etc. the identified communication recipient.

Figure 5:
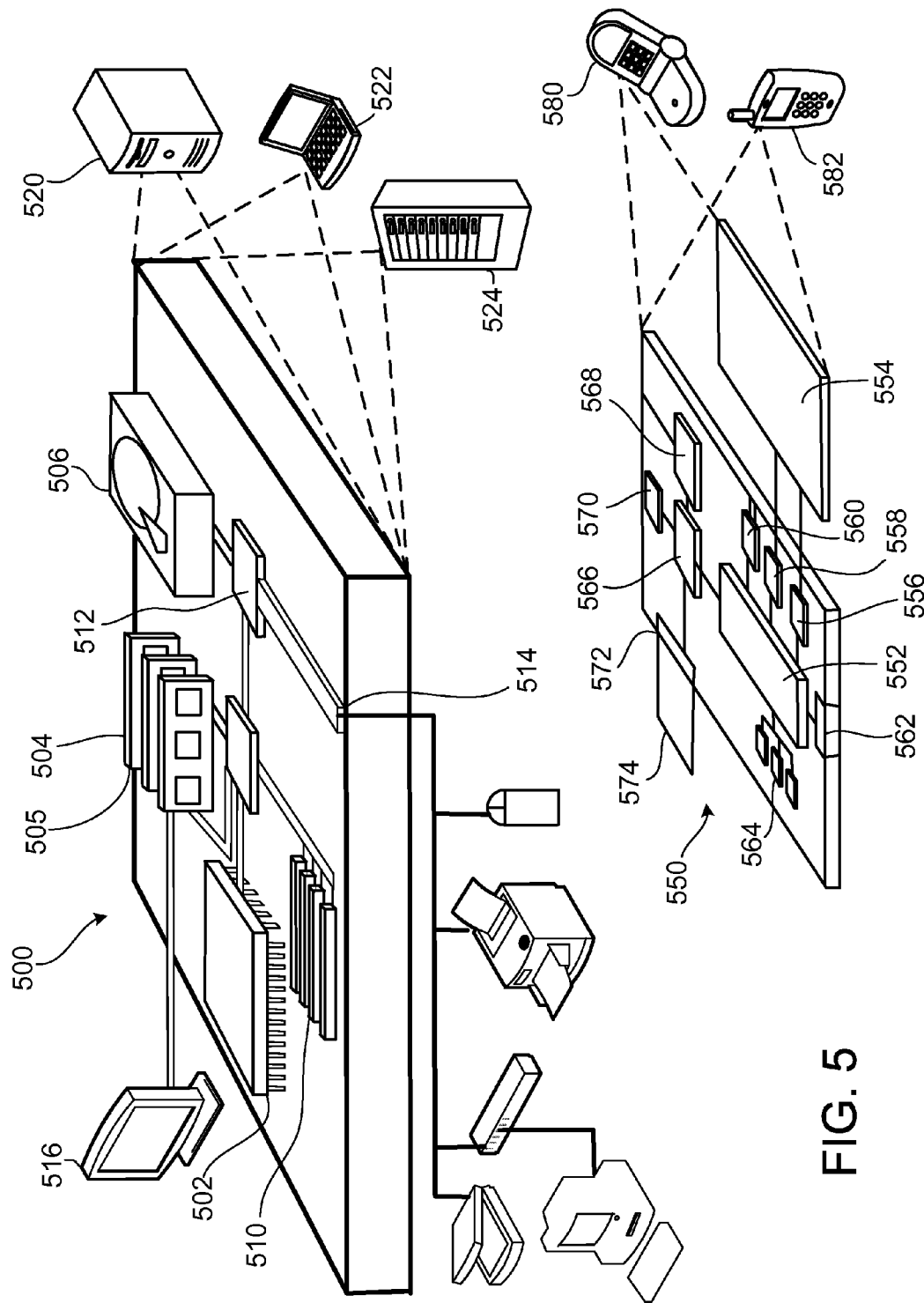
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data processing apparatus, the method comprising:
    receiving user input specifying an alias of an intended communication recipient;
    comparing the specified alias with identities of one or more potential recipients having respective implicit connections to the user, the implicit connections inferred from explicit information relating to the user;
    identifying one or more best matching recipients based on a result of the comparing, wherein at least one of the identified best matching recipients lacks an explicit connection to the user; and
    initiating a communication instance with the identified one or more best matching recipients.

2. The method of claim 1 wherein identifying one or more best matching recipients comprises using the inferred implicit connections to disambiguate between two or more potential recipients identified from explicit information.

3. The method of claim 1 wherein the intended communication recipient comprises at least one of a person, a non-human entity and a group of entities having a common identifiable characteristic.

4. The method of claim 1 further comprising, prior to receiving the user input specifying the alias, performing an analysis on the explicit information relating to the user to infer the implicit connections.

5. The method of claim 1 further comprising, subsequent to receiving the user input specifying the alias, performing an analysis on the explicit information relating to the user to infer the implicit connections.

6. The method of claim 1 wherein the explicit information comprises information obtained from one or more of a social network, email messages, documents and search history.

7. The method of claim 1 wherein initiating a communication instance comprises one or more of dialing a telephone number, addressing an email message, addressing a text message, posting an online message, sending a calendar invite, and sharing content.

8. The method of claim 1 further comprising, prior to comparing, generating explicit information by performing a personalized search relating at least in part to the user and to the specified alias.

9. The method of claim 1 further comprising, prior to initiating the communication instance, confirming the identified one or more best matching recipients with the user.

10. The method of claim 1 further comprising:
receiving user input specifying another alias relating to communication content;
comparing the specified other alias with identities of one or more potential content items identified based on implicit connections inferred from explicit information relating to the user;
identifying a best matching content item based on a result of the comparing; and
transmitting the identified best matching content item along with the communication instance to the identified one or more best matching recipients.

11. The method of claim 10 wherein the communication content comprises one or more of media content, a date, a location, an object and an event.

12. A non-transitory computer storage medium encoded with a computer program, the program comprising instructions that when executed by data processing apparatus cause the data processing apparatus to perform operations comprising:
receiving user input specifying an alias of an intended communication recipient;
comparing the specified alias with identities of one or more potential recipients having respective implicit connections to the user, the implicit connections inferred from explicit information relating to the user;
identifying one or more best matching recipients based on a result of the comparing, wherein at least of the identified best matching recipients lacks an explicit connection to the user; and
initiating a communication instance with the identified one or more best matching recipients.

13. The non-transitory computer storage medium of claim 12 wherein identifying one or more best matching recipients comprises using the inferred implicit connections to disambiguate between two or more potential recipients identified from explicit information.

14. The non-transitory computer storage medium of claim 12 wherein the intended communication recipient comprises at least one of a person, a non-human entity and a group of entities having a common identifiable characteristic.

15. The non-transitory computer storage medium of claim 12 further comprising, prior to receiving the user input specifying the alias, performing an analysis on the explicit information relating to the user to infer the implicit connections.

16. The non-transitory computer storage medium of claim 12 further comprising, subsequent to receiving the user input specifying the alias, performing an analysis on the explicit information relating to the user to infer the implicit connections.

17. The non-transitory computer storage medium of claim 12 wherein the explicit information comprises information obtained from one or more of a social network, email messages, documents and search history.

18. The non-transitory computer storage medium of claim 12 wherein initiating a communication instance comprises one or more of dialing a telephone number, addressing an email message, addressing a text message, posting an online message, sending a calendar invite, and sharing content.

19. The non-transitory computer storage medium of claim 12 further comprising, prior to comparing, generating explicit information by performing a personalized search relating at least in part to the user and to the specified alias.

20. The non-transitory computer storage medium of claim 12 further comprising, prior to initiating the communication instance, confirming the identified one or more best matching recipients with the user.

21. The non-transitory computer storage medium of claim 12 further comprising:
receiving user input specifying another alias relating to communication content;
comparing the specified other alias with identities of one or more potential content items identified based on implicit connections inferred from explicit information relating to the user;
identifying a best matching content item based on a result of the comparing; and
transmitting the identified best matching content item along with the communication instance to the identified one or more best matching recipients.

22. The non-transitory computer storage medium of claim 21 wherein the communication content comprises one or more of media content, a date, a location, an object and an event.

23. A system comprising:
a processor configured to execute computer program instructions; and
a computer storage medium encoded with computer program instructions that, when executed by the processor, cause the system to perform operations comprising:
receiving user input specifying an alias of an intended communication recipient;
comparing the specified alias with identities of one or more potential recipients having respective implicit connections to the user, the implicit connections inferred from explicit information relating to the user;
identifying one or more best matching recipients based on a result of the comparing, wherein at least one of the identified best matching recipients lacks an explicit connection to the user; and
initiating a communication instance with the identified one or more best matching recipients.

24. The system of claim 23 wherein the intended communication recipient comprises at least one of a person, a non-human entity, and a group of entities having a common identifiable characteristic.

25. The system of claim 23 further comprising, prior to receiving the user input specifying the alias, performing an analysis on the explicit information relating to the user to infer the implicit connections.

26. The system of claim 23 further comprising, subsequent to receiving the user input specifying the alias, performing an analysis on the explicit information relating to the user to infer the implicit connections.

27. The system of claim 23 wherein the explicit information comprises information obtained from one or more of a social network, email messages, documents and search history.

28. The system of claim 23 wherein initiating a communication instance comprises one or more of dialing a telephone number, addressing an email message, addressing a text message, posting an online message, sending a calendar invite, and sharing content.

29. The system of claim 23 further comprising, prior to comparing, generating explicit information by performing a personalized search relating at least in part to the user and to the specified alias.

30. The system of claim 23 further comprising:
- receiving user input specifying another alias relating to communication content;
- comparing the specified other alias with identities of one or more potential content items identified based on implicit connections inferred from explicit information relating to the user;
- identifying a best matching content item based on a result of the comparing; and
- transmitting the identified best matching content item along with the communication instance to the identified one or more best matching recipients.

* * * * *

UNITED STATES PATENT AND TRADEMARK OFFICE
CERTIFICATE OF CORRECTION

| | | |
|---|---|---|
| PATENT NO. | : 8,583,750 B1 | Page 1 of 1 |
| APPLICATION NO. | : 13/572208 | |
| DATED | : November 12, 2013 | |
| INVENTOR(S) | : Philip Hewinson | |

It is certified that error appears in the above-identified patent and that said Letters Patent is hereby corrected as shown below:

In the Claims

Column 11, line 36, Claim 12, please delete "least of" and insert therefor -- least one of --

Signed and Sealed this
Twenty-fifth Day of February, 2014

Michelle K. Lee
*Deputy Director of the United States Patent and Trademark Office*